United States Patent
Vafi et al.

(10) Patent No.: US 6,982,424 B2
(45) Date of Patent: Jan. 3, 2006

(54) X-RAY AND CT IMAGE DETECTOR

(75) Inventors: Habib Vafi, Brookfield, WI (US); Jeffrey Alan Kautzer, Pewaukee, WI (US); David Conrad Neumann, Milwaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 305 days.

(21) Appl. No.: 10/452,460

(22) Filed: Jun. 2, 2003

(65) Prior Publication Data

US 2004/0238750 A1    Dec. 2, 2004

(51) Int. Cl.
*G01T 1/24*  (2006.01)

(52) U.S. Cl. ............... 250/370.11; 250/370.09; 378/98.8

(58) Field of Classification Search ............ 250/370.09, 250/370.11, 363.02, 580, 591; 378/98.8
See application file for complete search history.

(56) References Cited

U.S. PATENT DOCUMENTS

| | | | | |
|---|---|---|---|---|
| 4,403,939 A | * | 9/1983 | Rothschild et al. | 425/425 |
| 4,734,588 A | * | 3/1988 | Akai | 250/370.11 |
| 5,315,113 A | * | 5/1994 | Larson et al. | 250/305 |
| 5,515,411 A | * | 5/1996 | Tonami et al. | 378/98.8 |
| 5,818,897 A | * | 10/1998 | Gordon | 378/19 |
| 5,880,472 A | * | 3/1999 | Polischuk et al. | 250/370.09 |
| 6,091,795 A | * | 7/2000 | Schafer et al. | 378/19 |
| 6,139,337 A | | 10/2000 | Englert et al. | |
| 6,525,320 B1 | | 2/2003 | Juni | |

* cited by examiner

*Primary Examiner*—David Porta
*Assistant Examiner*—Faye Polyzos
(74) *Attorney, Agent, or Firm*—Michael Della Penna, Esq.; Armstrong Teasdale LLP

(57) ABSTRACT

An X-ray detector includes a glass layer curved according to a pre-selected radius of curvature, a photoreceptor formed on the glass layer, and a backing layer curved according to the pre-selected radius of curvature. The backing layer supports the glass layer.

40 Claims, 4 Drawing Sheets

X-RAY AND CT IMAGE DETECTOR

BACKGROUND OF THE INVENTION

1. Field of the Invention

This invention relates generally to the field of medical imaging systems. In particular, the invention relates to an image detector, for example, for X-ray or computed tomography systems.

2. Related Art

X-ray systems produce 2-dimensional planar images, while Computed Tomography (CT) systems produce 2-dimensional sectional images, sometimes referred to as "slice" or "tomo" images. Although there is interest in obtaining CT style images in X-ray systems, particularly those used for vascular imaging, the detectors used for the two types of systems are significantly different. As a result, for reasons noted below, X-ray detectors are not well-suited to CT imaging and CT detectors do not lend themselves to X-ray imaging.

X-ray detectors are generally flat, or nearly flat in the case of detectors implemented as image intensifier tubes. As a result, the scintillator crystals that absorb the X-rays lie at varying distances and angles with reference to the X-ray source. As examples, pixels at the center of the flat detector are closer to the X-ray source and receive the X-ray beam straight-on. The pixels at the periphery of the detector receive a slightly attenuated X-ray beam at an angle. X-ray detectors using Image Intensifier tubes have curved input surfaces, but the orientation of the curvature is opposite to what would be desired for optimal image quality (the input surface of the vacuum tubes must be domed toward the patient to prevent collapse from atmospheric pressure while using the least possible structural material to minimize beam attenuation).

On the other hand, CT detectors are assembled in geometric shapes, typically circular arcs using a bulky and unwieldy structural frame. In that regard, the CT detector assembly was built as an arc shaped array of flat detector elements that used a many-sided polygon to approximate an arc of constant radius. In past, each CT detector element routed signals out of the detector element only through the top and bottom sides of the detector element (top and bottom in this case referring to orientations parallel to the axial direction of the detector). As the number of elements increased, the wire density along the top and bottom edges of the detector greatly increased. As a result, expanding the size and capabilities of a CT detector beyond a handful of detector elements became very difficult.

The differences in detector shape lead to differences in image processing steps applied after an exposure. Some X-ray systems, for example, implement geometric correction in the form of anamorphic optics in their video image capture components. These optics correct for image distortion arising from the adverse curvature of Image Intensifier tubes. In the case of flat X-ray detectors, there is a loss of image quality at the periphery of the detector relative to the center. The image quality loss arises because X-ray photons that should all be detected by a single peripheral pixel will, due to their transit at an angle through the thickness of the scintillator material, pass through the scintillator material above two or more pixels. As a result, the photons' contribution to the image is distributed (blurred) over more pixels than would be the case if the periphery of the detector were oriented perpendicular to the X-ray source, as are CT detector elements. Even image correction algorithms cannot fully compensate for the image quality degradation due to this geometric problem. When flat-panel X-ray detector image data is used with CT image reconstruction algorithms, this loss of image quality is also present in the CT images so obtained. Thus, the detectors for the two types of systems are very different, making it difficult and cumbersome to incorporate, for example, CT imaging in an X-ray system.

Therefore, there is a need for an image detector that overcomes, at least in part, the difficulties set forth above and others previously experienced.

BRIEF DESCRIPTION OF THE INVENTION

In one embodiment, an X-ray detector includes a glass layer curved according to a pre-selected radius of curvature, a photoreceptor formed on the glass layer, and a backing layer curved according to the pre-selected radius of curvature. The backing layer supports the glass layer.

In another embodiment, an X-ray detector includes a photoreceptor layer bounded by a periphery. The photoreceptor layer includes photoreceptors and inter-layer connection points inside the periphery. In addition, the X-ray detector includes a backing layer that supports the photoreceptor layer. The backing layer is curved according to a pre-selected radius of curvature and includes routing connection points. Electrical connections between the inter-layer connection points and the routing connection points establish electrical connectivity between the photoreceptor layer and the backing layer.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the X-ray detectors. In the figures, like reference numerals designate corresponding parts throughout the different views.

DETAILED DESCRIPTION

Figure 1:
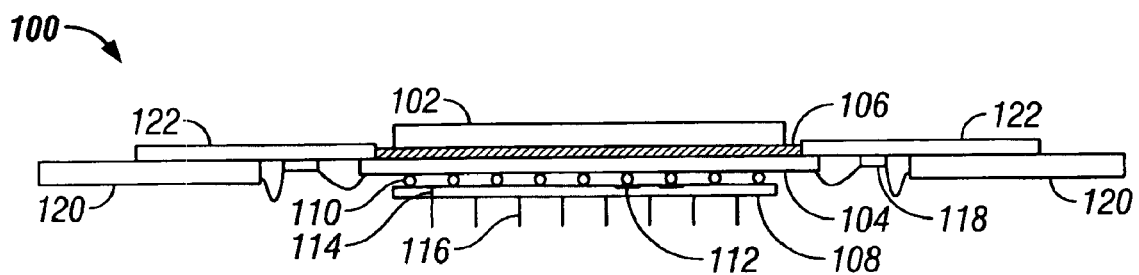
FIG. 1 illustrates an X-ray detector that includes a photoreceptor layer on silicon crystal supported by a curved backing structure.

Turning first to FIG. 1, that figure shows an X-ray detector 100 suitable for general purpose use in X-ray imaging systems as well as for specialized applications with the X-ray imaging system, such as CT imaging. The X-ray detector 100 includes a scintillator layer 102 attached to a silicon crystal photoreceptor layer 104 through an optical coupling epoxy 106. The scintillator layer 102 may be a CsI Thallium doped scintillator or Lumex scintillator available from Lumex of Palatine, Ill. A backing layer 108 that is curved according to a pre-selected radius of curvature supports the photoreceptor layer 104.

The photoreceptor layer 104 includes the interlayer connection points 110, while the backing layer 108 includes the routing connection points 112. The interlayer connection points 110 or routing connection points 112 may be as examples, bump pads, flat pads, pins, receptacles, or other types of signal connectivity structure. Electrical connections result through contact, soldering, or mechanical mating between the interlayer connection points 110 and the routing connection points 112. The electrical connections thereby establish electrical connectivity between the photoreceptor layer 104 and the backing layer 108. Vias 114 in the backing layer 108 carry signals from the photoreceptor layer 104 out to subsequent processing electronics on the conductors 116.

Additionally, wire bonding or other connectivity techniques may couple the photoreceptor layer 104 to signal processing circuits 118. The same connectivity techniques may then couple the signal processing circuits 118 to the conductive cable 120. The cable 120 may be, for example, a polyimide flex cable attached with ACF (anisotropic conductive adhesive) bonding. The support frames 122 carry the signal processing circuits 118. In that regard, the support frames 122 may be made from an iron based alloy such as Kovar™ material.

In one embodiment, the backing layer 108 is a ceramic backing layer with polyimide interconnect. In an alternative embodiment, the backing layer 108 is a metallic backing layer with an interconnecting layer. As one example, the backing layer 108 may be formed from a Kovar™ stiffener with electrical interconnections including copper conductive traces, insulated by insulating film (e.g., a polyimide film such as Kapton® film). The backing layer 108 is curved according to a pre-selected radius of curvature, and may, for example, take the place of bulky, heavy, and cumbersome mechanical support structures that arrange multiple X-ray detectors along a curve.

As described in more detail below, when the backing layer 108 is made from ceramic, several steps in the preparation process may be taken while the ceramic is in its unfired (e.g., in the "green tape" stage). For example, a drill machine may drill the vias 114. Additionally, the preparation process may also apply tungsten ink where conductive traces are desired on the ceramic. Subsequently, the ceramic is secured in a bent shape according to the pre-selected radius of curvature, then fired so that it retains the curvature.

The backing layer 108 may also be formed from multiple layers stacked on top of one another using a process suitable for constructing multiple layer printed circuit boards. In one embodiment, ceramic backing layers are approximately one eighth of an inch thick and one or more may be stacked to form the backing layer 108. The tungsten ink may then provide electrical connectivity for inner layers, while the outer layer may include a layer of copper plating over the tungsten ink.

The backing layer 108 may be sized to support a single X-ray detector module, or, as discussed below with reference to FIG. 3, the backing layer 108 may support multiple X-ray detector modules. Each X-ray detector module may include some or all of the structure shown in FIG. 1. Thus, for example, an X-ray detector module may include the scintillator layer 102, optical epoxy 106, and photoreceptor layer 104. In another embodiment, an X-ray detector module may further include the signal processing circuits 118, cable 120, and support frame 122.

The photoreceptor layer 104 may be formed as photodiodes and field effect transistor (FET) readout circuits on a silicon substrate. Through vias can then be present in both the silicon substrate and the backing layer 108. As noted above, electrical connections couple the photoreceptor layer 104 to the backing layer 108.

Figure 2:
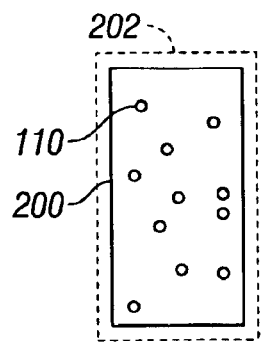
FIG. 2 shows the back of a photoreceptor layer with interlayer connection points.

More specifically, turning to FIG. 2, that figure shows the back of a photoreceptor layer 200. Reference numeral 202 indicates the periphery of the photoreceptor layer 200. Note that the interlayer connection points 110 are provided inside the periphery for connection to the backing layer 108. In other words, electrical connectivity is available over the entire area of the photoreceptor layer 200, as opposed to only along the periphery 202. Several benefits result, including shorter electrical connection lengths, reduced noise, increased routing density, and the like.

Figure 3:
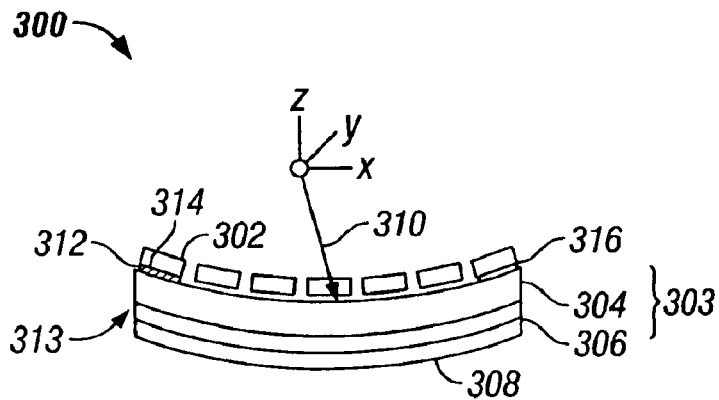
FIG. 3 illustrates X-ray detector curvature.

With regard next to FIG. 3, that Figure shows a cross sectional view of an X-ray detector 300. The X-ray detector includes multiple X-ray detector modules 302 supported on a multiple layer backing layer 303. In particular, in this example, the backing layer 303 includes three layers of ceramic material 304, 306, and 308, each of which may include signal traces, vias, and other types of electrical connectivity routing.

The backing layer is curved according to a pre-selected radius of curvature 310, and supports the X-ray detector modules 302. The pre-selected radius of curvature 310 may have its origin, for example, at the source of X-ray photons used to illuminate the X-ray detector 300, and its endpoint at the location where the X-ray detector 300 rests in the imaging system.

Note also that a polymer layer 312 disposed between one or more of the X-ray detector modules 302 and the backing layer 304 matches a back surface 314 (generally a flat surface) of the X-ray detector module 302 to the pre-selected radius of curvature 310. That is, the polymer layer 312 allows the curved underlying layer (e.g., the backing layer 304) to support a flat surface.

Alternatively, the backing layer 108 may include polygonal flat surfaces 316 to match the flat back surface 314 of a particular X-ray detector module 302. The polygonal flat surface 316 may be, for example, an extension of the ceramic material of the backing layer 304, or a separately fabricated flat support structure attached to the backing layer 304. Note that the backing layer 303 replaces the bulky, heavy, and cumbersome mechanical support structure that would ordinarily secure X-ray modules along a curve.

One axis of curvature is present in the X-ray detector 300 shown in FIG. 3. The backing layer is therefore a cylindrical section. However, in other implementations, the backing layer may curve along two axes of curvature instead. For two axes of equal curvature, the backing layer and resultant X-ray detector take the form of a spherical section. For two axes of unequal curvature, the backing layer and resultant X-ray detector take the form of an ellipsoidal section. System design parameters and the requirements of the specific imaging system for which the detector is built drive the choice of curving on one or more axes.

Note that in one embodiment, the X-ray detector modules 302 may be conventional CT detector modules. The detector modules are then attached to the backing layer as noted above, with a polymer layer 312 or flat polygonal surfaces 316 to help support the CT detector modules. In this embodiment, the routing connection points 112 (and internal signal routing traces, vias, and the like) may also provide significant additional signal routing capability to the array of pre-existing CT detector modules. An additional benefit is the elimination or substantial reduction of the bulky, heavy, and cumbersome mechanical frame support structure that would ordinarily secure X-ray modules along a curve.

Figure 4:
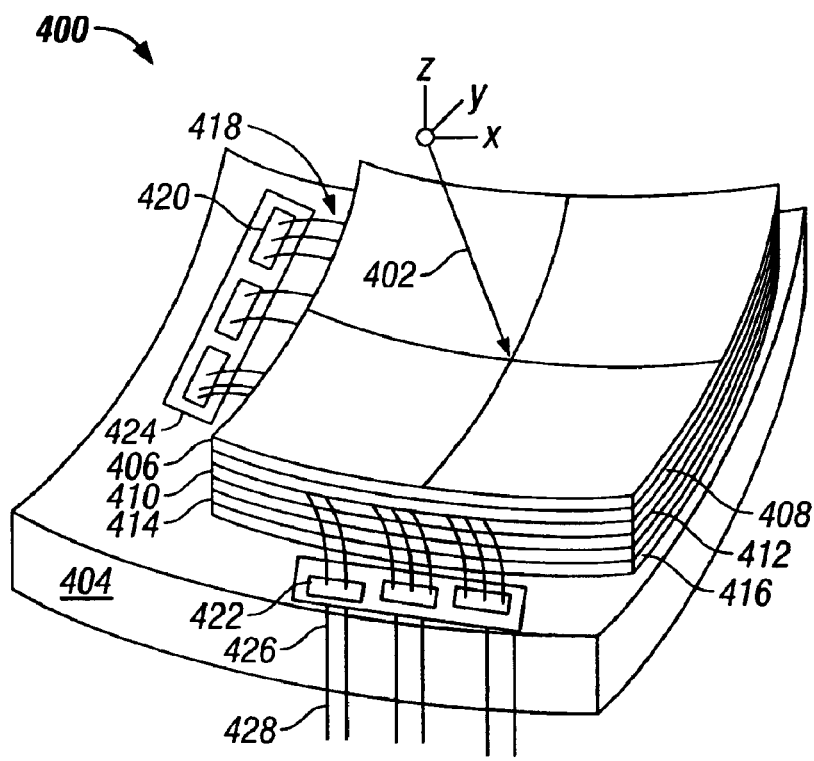
FIG. 4 shows an X-ray detector that includes an amorphous silicon layer supported by a curved backing structure.

Turning next to FIG. 4, that figure shows an X-ray detector 400 curved along the X and Y axes. One radius of curvature is indicated at reference numeral 402. As noted above, the center of curvature may be the focal spot for emission of X-ray energy. In the X-ray detector 400, a backing layer 404 supports several additional layers. Those layers include a cover layer 406, a scintillator layer 408, and a photoreceptor layer 410. A substrate layer 412 (e.g., an amorphous silicon substrate) supports the photoreceptor layer 410, and a thin glass layer 414 and a polymer support layer 416 for the glass layer 414 are also present. The layers may be arbitrarily wide and long, as determined according to the system design parameters for a given X-ray imaging system.

The thicknesses of the layers may be, as examples: 0.5 mm for the cover layer 406, 0.4 mm to 2 mm for the scintillator layer 408, 0.1 mm to 0.2 mm for the amorphous silicon and other active electronic layers 412, 0.2 mm to 0.3 mm for the thin glass layer 414, and 0.5 mm to 1 mm for the polymer support layer 416.

The thin glass layer 414 is thin enough to bend along the radius of curvature without cracking or breaking. To that end, the thin glass layer 414 may be, for example, a 0.2 mm to 0.3 mm thin glass layer bonded to a thicker polymer layer. The polymer support layer 416 helps to keep the glass layer 414 strong during handling.

The photoreceptor layer 410 may be implemented as an active matrix array of photodiodes that receive light from the scintillator layer 408. In other words, the photoreceptor layer 410 may include photodiode pixels with associated readout transistors coupled to the photodiodes. One axis of the photoreceptor layer 410 may then be regarded as a scan axis to activate the readout transistors, while the other axis may be regarded as the data readout direction to take pixel data to subsequent processing circuits, including Analog to Digital converters.

As shown in FIG. 4, the cables (e.g., polyimide flex cables) 418 connect the photoreceptor layer 410 to processing electronics. The processing electronics may include active matrix scanning modules 420 and readout modules 422, as examples. In one embodiment, polyimide layers 424 support the readout electronics.

Note that the backing layer 404 includes the vias 426. The vias 426 connect to the processing electronics and provide a signal propagation path out of the processing electronics and into the backing layer 404. The backing layer 404 may include one or more layers, each with routing traces, vias, pads, or other signal routing mechanisms to provide complex routing capabilities that direct signals from the processing electronics to subsequent processing blocks in the X-ray imaging system. Cables 428 may connect to the backing layer 404 for connection to the subsequent processing blocks.

Thus, the backing layer 404 provides another dimension of routing capability for the X-ray detector 400. In other words, the X-ray detector 400 is not limited to connecting to cables only around its periphery. Greater routing density and flexibility result.

The backing layer 404 may be take the form and be prepared as noted above with regard to FIG. 1. For example, the backing layer 404 may be one or more layers of ceramic, or may be a metallic backing layer with an interconnecting layer. The backing layer 404 acts as a stiffener behind the curved glass layer 414 and helps the glass layer 414 hold to the radius of curvature.

The cover layer 406 may be a graphite epoxy matrix with a layer of aluminum foil bonded to the matrix by epoxy. Thus, the cover layer 406 is a thin but strong structure and the aluminum foil provides a hermetic seal without significantly attenuating X-rays. The scintillator layer 408 may be a CsI layer doped with Thalliuim. Optionally, an optically reflective layer may be formed on top of the scintillator layer 408. The optically reflective layer may include, for example, a layer of polymer (e.g., mylar) onto which a reflective metal coating such as silver or aluminum is deposited, optionally including a reflective coating such as titanium dioxide, in order to increase light absorption by the scintillator layer 408.

Figure 5:
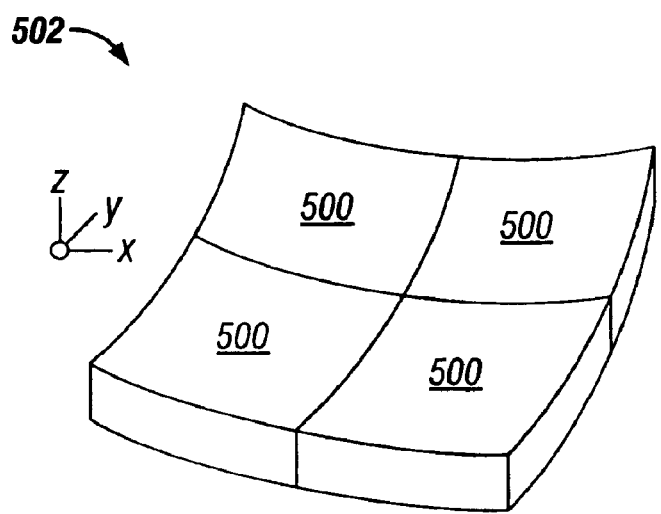
FIG. 5 shows an X-ray detector formed from multiple X-ray detector tiles arrange along a first and second axis.

As shown in FIG. 5, multiple X-ray detector tiles 500 form a larger X-ray detector 502. Each of the X-ray detector tiles 500 may be implemented as a separate X-ray detector 400, for example. The tiles 500 may then be arranged along one or more axes in arbitrary numbers to form the larger X-ray detector 502. As shown in FIG. 5, two tiles 500 are arranged on the X-axis, and two tiles are arranged on the Y-axis to the form the X-ray detector 502.

Figure 6:
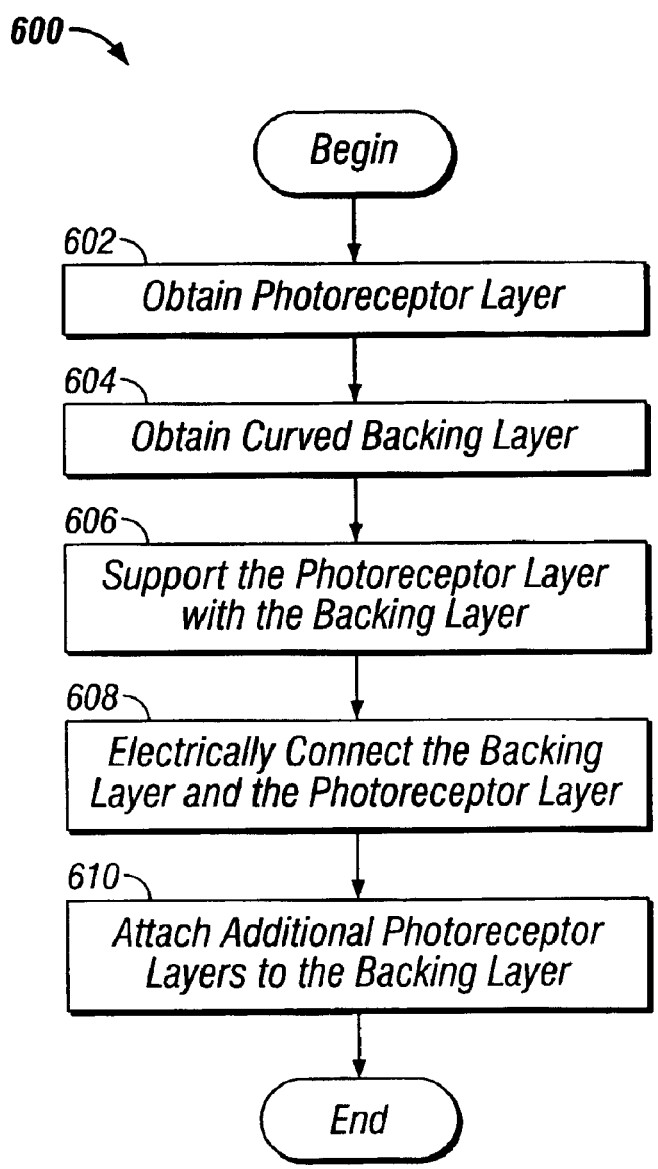
FIG. 6 shows a method of fabricating the X-ray detector shown in FIG. 1.

Turning now to FIG. 6, that figure summarizes a method for fabricating the X-ray detector 100 shown in FIG. 1. First, a photoreceptor layer is obtained (Step 602). The photoreceptor layer is bounded by a periphery and includes photoreceptors and interlayer connection points inside the periphery. The photoreceptor layer may be, for example, a plurality of photodiodes fabricated on a silicon crystal.

A curved backing layer is also obtained (Step 604). The backing layer may be a ceramic or metallic backing layer prepared as noted above, or as noted below with regard to FIG. 7. The curved backing layer thus includes routing connection points and, optionally, internal connective traces that provide significant signal routing capabilities beyond peripheral only connections around the photoreceptor layer.

Next, the photoreceptor layer is attached to the backing layer for support (Step 606). To that end a polymer layer may be disposed between the photoreceptor layer and the backing layer. Alternatively, the backing layer may include polygonal flat surfaces that match flat back surfaces of a particular photoreceptor layer.

Electrical connectivity is then established between the photoreceptor layer and the backing layer (Step 608). For example, the interlayer connection points may contact, mate with, or be soldered to the routing connection points on the backing layer. Additional photoreceptor layers may then be attached in the same way to the backing layer to form a larger X-ray imaging array (Step 610).

Figure 7:
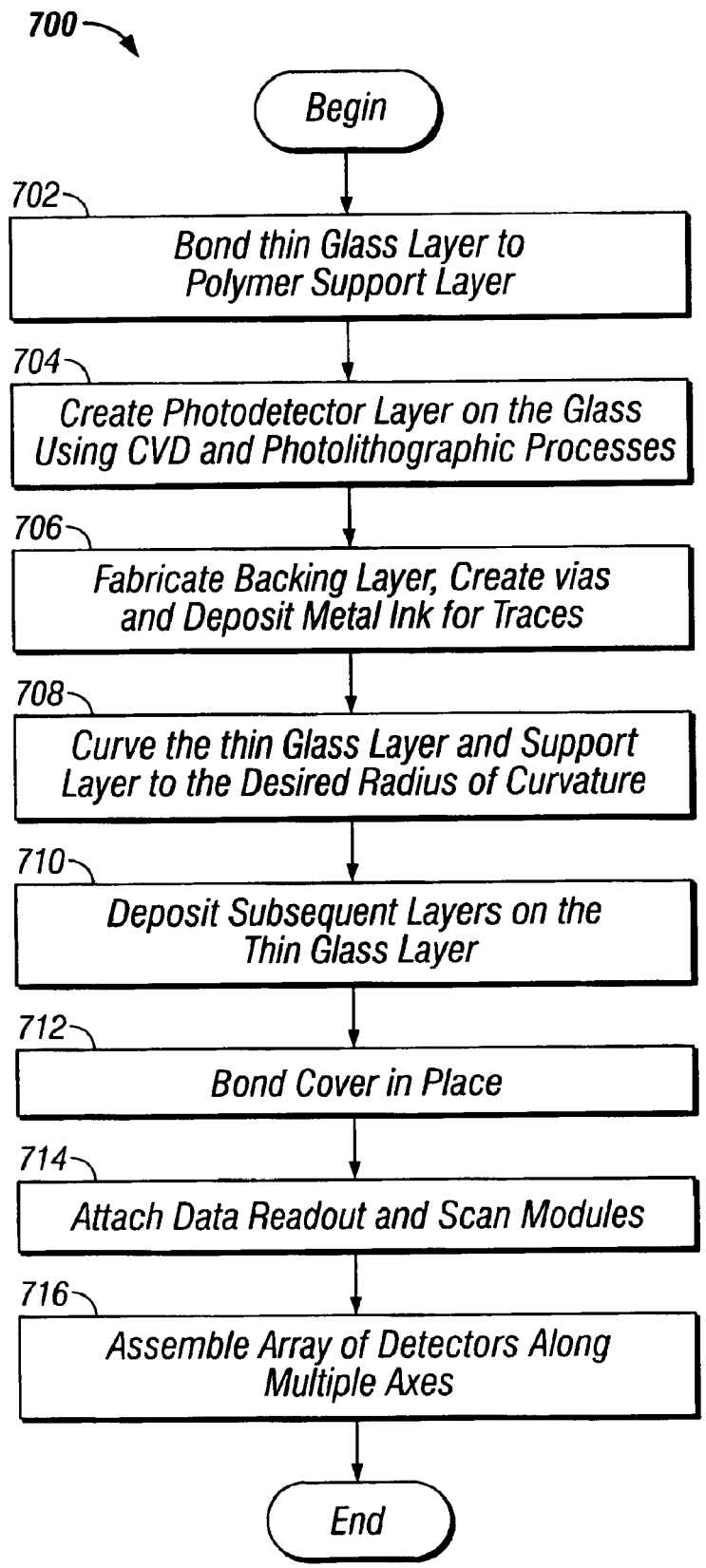
FIG. 7 shows a method of fabricating the X-ray detector shown in FIG. 4.

Turning next to FIG. 7, that figure summarizes a method for fabricating the X-ray detector 400 shown in FIG. 4. A thin glass layer is bonded to a polymer layer to provide support for handling during processing and for the final product (Step 702). The resultant substrate is testable as a raw material to ensure it meets pre-selected quality specifications. Subsequently, chemical vapor deposition (CVD) processes and photolithographic masking processes fabricate the photodetector electronic layers on the glass surface (Step 704). The electronic layers may include photodiodes, FETs, and a matrix of scan and data lines for electronic image acquisition, as well as insulation layers or other layers specified by design. Note that the thin glass layer is typically held flat during the deposition processes, and as a result, existing CVD and photolithographic masking processes may be used to fabricate the electronic layers. The resultant subassembly is testable for quality control purposes.

In addition, a backing structure is fabricated (Step 706). For example, when the backing layer is a ceramic backing layer, a drill process may create holes for vias through the backing layer when it is still in the flexible ("green tape") stage. Also, metalized ink (e.g., tungsten ink) is deposited on the ceramic at this stage wherever metal traces are desired after the ceramic is fired. The backing layer is then formed into the curved shape desired for the final form for the X-ray detector. The ceramic is then fired, after which it is in rigid form. A metallization process then provides metal through-vias, as well conduction paths on the surface of the ceramic. Multiple thin backing layers (individually prepared as just described) may be vertically stacked to form the overall backing layer. The overall backing layer may include multiple stacked thinner layers.

Next, the flexible thin glass and polymer substrate is curved to the desired geometry of the final X-ray detector shape (Step 708). In one fabrication process, the curvature may be achieved by using a vacuum to pull the thin glass and polymer substrate against the backing layer (which already has the desired shape), and then bonding the thin glass and polymer substrate to the backing layer. Gas pressure may be used as an alternative to, or in addition to, the vacuum to help force the thin glass and polymer substrate against the backing layer during this shaping and bonding process.

The process may then deposit additional layers on the thin glass layer (Step 710). For example, a CVD process may deposit the scintillator layer, sealing layers, and the like onto the thin glass layer. The scintillator layer is generally deposited after the thin glass layer is curved so that the scintillator's brittle needle-shaped crystals (typically CsI doped with Thallium) are not broken or pushed together to cause delamination.

When CVD of the scintillator layer, and any subsequent layers, is complete, a cover that is curved to fit the detector is attached and bonded in place (Step 712). The cover seals the X-ray detector to prevent moisture from being absorbed by the scintillator layer. The X-ray detector is testable at this level. The detector may then be connected to the rest of the image detector assembly by flex-circuit connections. At this time, data readout modules and scan modules may be attached along the edges of the X-ray detector (Step 714). As described above with reference to FIG. 5, multiple individual X-ray detector tiles may then be arranged along one or more axes to form a larger detector (Step 716).

The X-ray detectors described above are suitable for use with general purpose X-ray imaging systems. They are further suitable for X-ray detectors capable of CT reconstruction, whether "partial", e.g., tomosynthesis, where detector is fixed and radiation source is moved through an arc significantly smaller than 180 degrees, or full tomography, where both detector and radiation source are moved through a large arc, typically at least 180 degrees for full image reconstruction.

The X-ray detectors described meet the need for high density routing of electronic signals in and out of the detector components, typically photodiodes and FETs with interconnect lines. Where a thin glass layer is used, edge connection technologies such as flex circuits with ACF bonding or conventional wirebonding may be used to take the signal "off the glass". The backing layer then provides the opportunity to use vias through the ceramic, and also the opportunity to fabricate conductive traces in layers within the ceramic for substantial signal routing flexibility.

While various embodiments of the invention have been described, it will be apparent to those of ordinary skill in the art that many more embodiments and implementations are possible that are within the scope of this invention.

What is claimed is:

1. An X-ray detector comprising:
   a glass layer curved according to a pre-selected radius of curvature;
   a photoreceptor formed on the glass layer; and
   a backing layer curved according to the pre-selected radius of curvature, the backing layer supporting the glass layer.

2. The X-ray detector of claim 1, wherein the backing layer is a ceramic backing layer.

3. The X-ray detector of claim 1, further comprising support layer between the glass layer and the backing layer.

4. The X-ray detector of claim 3, wherein the support layer is a polymer layer.

5. The X-ray detector of claim 1, wherein the backing layer further comprising signal conductors.

6. The X-ray detector of claim 1, wherein the backing layer comprises a plurality of stacked thinner layers.

7. The X-ray detector of claim 1, wherein the glass layer and the backing layer are curved according to the first pre-selected radius of curvature along a first pre-selected axis.

8. The X-ray detector of claim 1, wherein the glass layer and the backing layer are curved according to the first pre-selected radius of curvature along a first pre-selected curvature axis and curved according to a second pre-selected radius of curvature along a second pre-selected curvature axis.

9. The X-ray detector of claim 8, wherein the first radius of curvature is different than the second radius of curvature.

10. The X-ray detector of claim 1, further comprising a scintillator layer above the glass layer.

11. The X-ray detector of claim 1, wherein the glass layer is a thin, flexible glass layer.

12. A method of fabricating an X-ray detector, the method comprising the steps of:
    attaching a thin flexible glass layer to a support layer; and
    attaching the glass layer and support layer to a backing layer curved according to a pre-selected radius of curvature.

13. The method of claim 12, wherein the step of attaching the glass layer comprises the step of attaching the glass layer to a ceramic backing layer.

14. The method of claim 12, further comprising the step of adding vias to the backing layer.

15. The method of claim 12, further comprising the step of adding metallized ink on the backing layer where metal traces will run.

16. The method of claim 12, further comprising the step of forming the backing layer into a curved shape having the pre-selected radius of curvature.

17. The method of claim 16, further comprising the step of firing the ceramic for rigidity.

18. The method of claim 12, further comprising the step of forming the backing layer by stacking a plurality of thinner support layers.

19. An X-ray detector comprising:
    at least first and second detector tiles, each detector tile comprising:
    a glass layer curved according to a pre-selected radius of curvature;

photoreceptors formed on the glass layer; and a backing layer curved according to the pre-selected radius of curvature, the backing layer supporting the glass layer.

20. The X-ray detector of claim 19, further comprising a third detector tile, wherein each detector tile comprises:

a glass layer curved according to a pre-selected radius of curvature;

photoreceptors formed on the glass layer; and a backing layer curved according to the pre-selected radius of curvature, the backing layer supporting the glass layer.

21. The X-ray detector of claim 20, wherein at least two of the detector tiles are disposed along a first axis.

22. The X-ray detector of claim 20, wherein at least two of the detector tiles are disposed along a first axis and have a coincident center of curvature.

23. The X-ray detector of claim 20, wherein the detector tiles are disposed along at least two axes.

24. The X-ray detector of claim 22, wherein the detectors tiles are disposed along at least two axes and have a coincident center of curvature.

25. The X-ray detector of claim 22, wherein the glass layer and backing layer of at least one detector tile are curved according to the pre-selected radius of curvature along a first curvature axis, and curved according to a second pre-selected radius of curvature along a second curvature axis.

26. The X-ray detector of claim 19, wherein the glass layer and backing layer of at least one detector tile are curved according to the pre-selected radius of curvature along a first curvature axis, and curved according to a second pre-selected radius of curvature along a second curvature axis.

27. The X-ray detector of claim 19, wherein at least one of the backing layers comprises a plurality of stacked ceramic layers.

28. The X-ray detector of claim 19, wherein at least one of the backing layers comprises a ceramic backing layer.

29. An X-ray detector comprising:

a photoreceptor layer bounded by a periphery and comprising photoreceptors and inter-layer connection points inside the periphery; and a backing layer supporting the photoreceptor layer, the backing layer curved according to a pre-selected radius of curvature and comprising routing connection points; and electrical connections between the inter-layer connection points and the routing connection points to establish electrical connectivity between the photoreceptor layer and the backing layer.

30. The X-ray detector of claim 28, wherein the backing layer supports a plurality of individual photoreceptor layers arranged to follow the pre-selected radius of curvature.

31. The X-ray detector of claim 28, wherein the photoreceptor layer comprises a silicon tile supporting the photoreceptors.

32. The X-ray detector of claim 28, wherein the inter-layer connection points comprise pads on the photoreceptor layer.

33. The X-ray detector of claim 28, wherein the backing layer comprises a ceramic backing layer.

34. The X-ray detector of claim 28, wherein the backing layer comprises a metal backing layer with an insulation layer.

35. The X-ray detector of claim 28, further comprising a polymer layer between the photoreceptor layer and the backing layer that matches a back surface of the photoreceptor layer to the pre-selected radius of curvature.

36. A method for fabricating an X-ray detector, the method comprising the steps of:

obtaining a photoreceptor layer bounded by a periphery and comprising photoreceptors and inter-layer connection points inside the periphery;

obtaining a backing layer curved according to a pre-selected radius of curvature and comprising routing connection points;

supporting the photoreceptor layer with the backing layer; and connecting the photoreceptor layer to the backing layer by establishing electrical connections between the inter-layer connection points and the routing connection points.

37. The method of claim 35, wherein:

the step of obtaining a photoreceptor layer comprises the step of obtaining a plurality of photoreceptor layers, each comprising interlayer connection points;

the step of supporting comprises the step of supporting the plurality of photoreceptor layers with the backing layer so that the plurality of photoreceptor layers follows the pre-selected radius of curvature; and the step of connecting comprises the step of connecting the plurality of photoreceptors to the backing layer through electrical interconnections between the inter-layer connection points and the routing connection points.

38. The method of claim 35, wherein the step of obtaining a backing layer comprises the step of obtaining a ceramic backing layer with the pre-selected radius of curvature.

39. The method of claim 35, wherein the step of obtaining a backing layer comprises the step of obtaining a metal backing layer with an insulation layer.

40. The method of claim 35, further comprising the step of adding a polymer layer between the photoreceptor layer and the backing layer that matches a back surface of the photoreceptor layer to the pre-selected radius of curvature.

* * * * *